United States Patent [19]

Favre et al.

[11] Patent Number: 4,970,651

[45] Date of Patent: Nov. 13, 1990

[54] AUTONOMOUS KINEMATIC MEASUREMENT SYSTEM FOR HELICOPTERS

[75] Inventors: Helene Favre, Massy; Jean T. Audren, Orsay, both of France

[73] Assignee: Societe de Fabrication D'Instruments de Mesure (S.F.I.M.), Massy, France

[21] Appl. No.: 155,559

[22] Filed: Feb. 11, 1988

[30] Foreign Application Priority Data

Feb. 12, 1987 [FR] France ................................ 8701770

[51] Int. Cl.$^5$ .................... G01C 21/10; G05D 1/00
[52] U.S. Cl. .............................. 364/434; 73/178 H; 244/17.13
[58] Field of Search ............... 244/17.13, 17.11, 17.19, 244/17.21; 364/434, 435, 566; 73/178 H

[56] References Cited

U.S. PATENT DOCUMENTS

| | | | |
|---|---|---|---|
| 2,845,623 | 7/1958 | Iddings | 73/178 H |
| 4,023,409 | 5/1977 | Durand | 244/17.13 X |
| 4,029,271 | 6/1977 | Murphy et al. | 73/178 H |
| 4,129,275 | 12/1978 | Gerstine et al. | 364/434 X |
| 4,300,200 | 11/1981 | Doe | 244/17.13 X |
| 4,646,243 | 2/1987 | Graupp et al. | 364/566 |
| 4,648,269 | 3/1987 | Durand | 73/178 H |
| 4,702,106 | 10/1987 | Hassenpflug et al. | 73/178 H X |
| 4,794,793 | 1/1989 | Fanre et al. | 73/178 H |
| 4,829,441 | 5/1989 | Mandle et al. | 364/434 |

FOREIGN PATENT DOCUMENTS

204856 12/1986 European Pat. Off. .

Primary Examiner—Eugene R. LaRoche
Assistant Examiner—Benny Lee
Attorney, Agent, or Firm—Blakely, Sokoloff, Taylor & Zafman

[57] ABSTRACT

An autonomous kinematic measurement system for helicopters is disclosed. A helicopter comprises a lifting rotor, an anti-torque rotor, first means to control the cyclical pitch and the collective pitch of the rotor and second means to control the pitch of the anti-torque rotor. The system comprises means to measure the helicopter's ground speed, means to measure the longitudinal cyclical pitch of the lifting rotor blades, means to measure the lateral cyclical pitch of the lifting rotor blades, means to measure the collective pitch given to the lifting rotor blades, and means to measure the pitch of the anti-torque rotor. An inertial unit, provided with ancillary computing means, uses a direction signal and a helicopter attitude signal corresponding to the longitudinal acceleration signal and lateral acceleration signal of the helicopter's ground speed signal to establish the helicopter's longitudinal and lateral airspeed values, following a determination of the coefficients $\alpha,\beta$, establishing, from measurements of the above-mentioned helicopter's mechanical and dynamic parameters, the above-mentioned speed values. The invention can be applied to the determining of the above-mentioned coefficients $\alpha$ and $\beta$, to the piloting of military and civilian helicopters and to flight simulation.

17 Claims, 4 Drawing Sheets

AUTONOMOUS KINEMATIC MEASUREMENT SYSTEM FOR HELICOPTERS

BACKGROUND OF THE INVENTION

1. Field of the Invention

The invention pertains to an autonomous kinematic measurement system for helicopters.

2. Description of the Prior Art

At present, helicopter navigation systems can be used to determine a helicopter's navigational parameters, such as its relative speed with respect to the ground (hereinafter designated as its ground speed), its direction angle $\theta$, defined as the angle between its longitudinal axis and the direction of the geographical North, and its relative speed with respect to the air (hereinafter designated as its airspeed), expressed according to its longitudinal component, Vax, parallel to the longitudinal axis xx of the helicopter, and its lateral component, Vay, parallel to an axis yy which is perpendicular to the longitudinal axis xx. For convenience, but non-restrictively, the longitudinal axis xx and the transversal axis yy of the helicopter intersect at the center of gravity G of the said helicopter and, when the helicopter is on the ground, they define a plane parallel to the said helicopter. Airspeed indicator units are used to determine the helicopter's airspeed. While these units give a very precise definition of the helicopter's airspeed, especially its longitudinal component, Vax, in the high speed range, namely for a longitudinal speed component, Vax, of greater than 50 knots or about 25 m/s, this is not so in the low speed range corresponding to speed components of less than 25 m/s and especially at the low hovering speeds of the helicopter. In this latter case, the the helicopter's airspeed can be obtained only by using special, expensive and delicate instruments which can hardly be considered for use except in the context of in-flight tests.

Present-day navigation systems for operational helicopters therefore lack constancy of precision in the measurement of airspeeds at low speed levels in the above-mentioned speed range. Furthermore, to remove this disadvantage, they depend on ancillary measuring instruments which are delicate and difficult to use.

SUMMARY OF THE INVENTION

The autonomous kinematic measurement system for helicopters, according to the invention, is aimed at removing the above-mentioned disadvantages by using an autonomous kinematic measurement system for helicopters through which precision, in the measurement of the helicopter's airspeed, can be obtained to a degree which is substantially comparable throughout the range of the said speed of the helicopter.

Another object of the kinematic measurement system of the invention is the use of a kinematic measurement system for helicopters that does not require ancillary instruments to measure a helicopter's airspeed in the low speed range.

Another object of the present invention is the use of an autonomous kinematic measurement system for helicopters wherein, without ancillary instruments to measure the the helicopter's airspeed at low speeds, the longitudinal component, Vax, and the lateral component, Vay, are determined solely from the mechanical and/or dynamic operating parameters of the helicopter in flight.

Another object of the autonomous kinematic measurement system for helicopters, according to the invention, is the use of a non-dedicated autonomous kinematic measurement system for helicopters, wherein the said non-dedicated autonomous kinematic measurement system for helicopters can be conditioned to become a dedicated kinematic measurement system, namely a kinematic measurement system that is configured not only to one type of helicopter but to each helicopter of a considered type, following a process of education or calibration of the system during a test flight.

Another object of the autonomous kinematic measurement system according to the invention is, finally, the use of an adaptive autonomous measurement system, namely one that can provide almost total independence of precision in measuring the values of the components of the helicopter's airspeed despite the fact that the mechanical or dynamic characteristics of the mechanical components of the helicopter, that enable the determining of the said speeds, are subject to variation and deterioration depending on the wearing out of the said components and/or their disparity or variation when they are replaced during routine maintenance programmes.

The autonomous kinematic measurement system for helicopters, according to the invention, with the said helicopter comprising a lifting rotor, an anti-torque rotor, first means to control the cyclic pitch and the collective pitch of the lifting rotor and second means to control the pitch of the anti-torque rotor, is distinguished by the fact that, longitudinal and transversal directions being defined by a reference of axes x, y, related to the center of gravity of the helicopter and defining, with the helicopter on the ground, a plane parallel to the said helicopter, the said system comprises means to measure the helicopter's ground speed, the said means giving, during operation, a signal of the helicopter's ground speed, means to measure the longitudinal cyclic pitch and lateral cyclic pitch of the lifting rotor blades, the said means giving a longitudinal cyclic pitch and lateral cyclic pitch measurement signal, means to measure the collective pitch applied to the lifting rotor blades, the said means giving a collective pitch measurement signal, anti-torque rotor pitch measuring means, accelerometer type means, the said accelerometer type means being used to give a helicopter acceleration signal, the said acceleration signal corresponding to a first signal that represents the helicopter's longitudinal acceleration and a second signal that represents the helicopter's lateral acceleration relative to the ground, means to measure the helicopter's direction angle, used to give a signal representing the helicopter's direction angle, ancillary computing means that receive data on the helicopter's ground speed, the longitudinal, lateral and collective cyclic pitch of the lifting rotor, the anti-torque rotor pitch, the helicopter's longitudinal and transversal acceleration with respect to the ground, and that give data on the helicopter's longitudinal and lateral airspeeds, the said longitudinal and lateral speeds being computed from a one-to-one function of the values of the measured mechanical and dynamic parameters of the lifting rotor's longitudinal and transversal cyclic pitch and its collective pitch, the anti-torque rotor pitch and the helicopter's longitudinal and lateral acceleration with respect to the ground.

The invention finds application in the aeronautical industry relating to helicopters for military or civilian use.

BRIEF DESCRIPTION OF THE DRAWINGS

It will be better understood from the following description and drawings, of which.

MORE DETAILED DESCRIPTION OF THE INVENTION

Figure 1A:
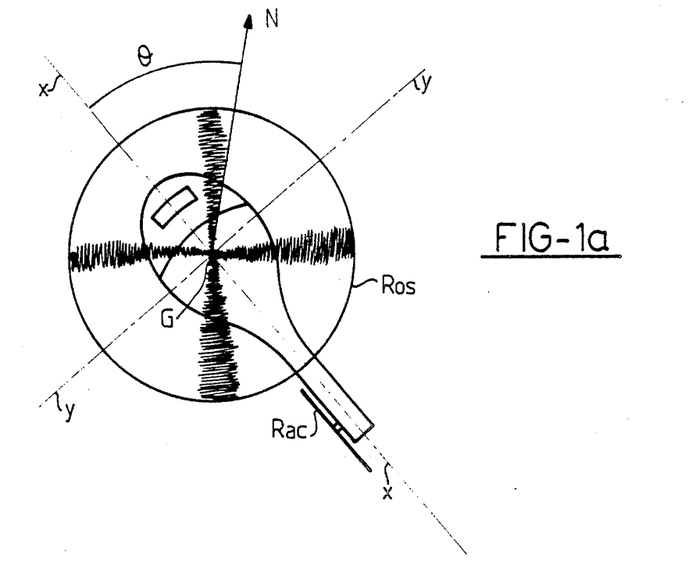
FIG. 1a represents a top view of a helicopter in flight.
Figures 1B, 1C:
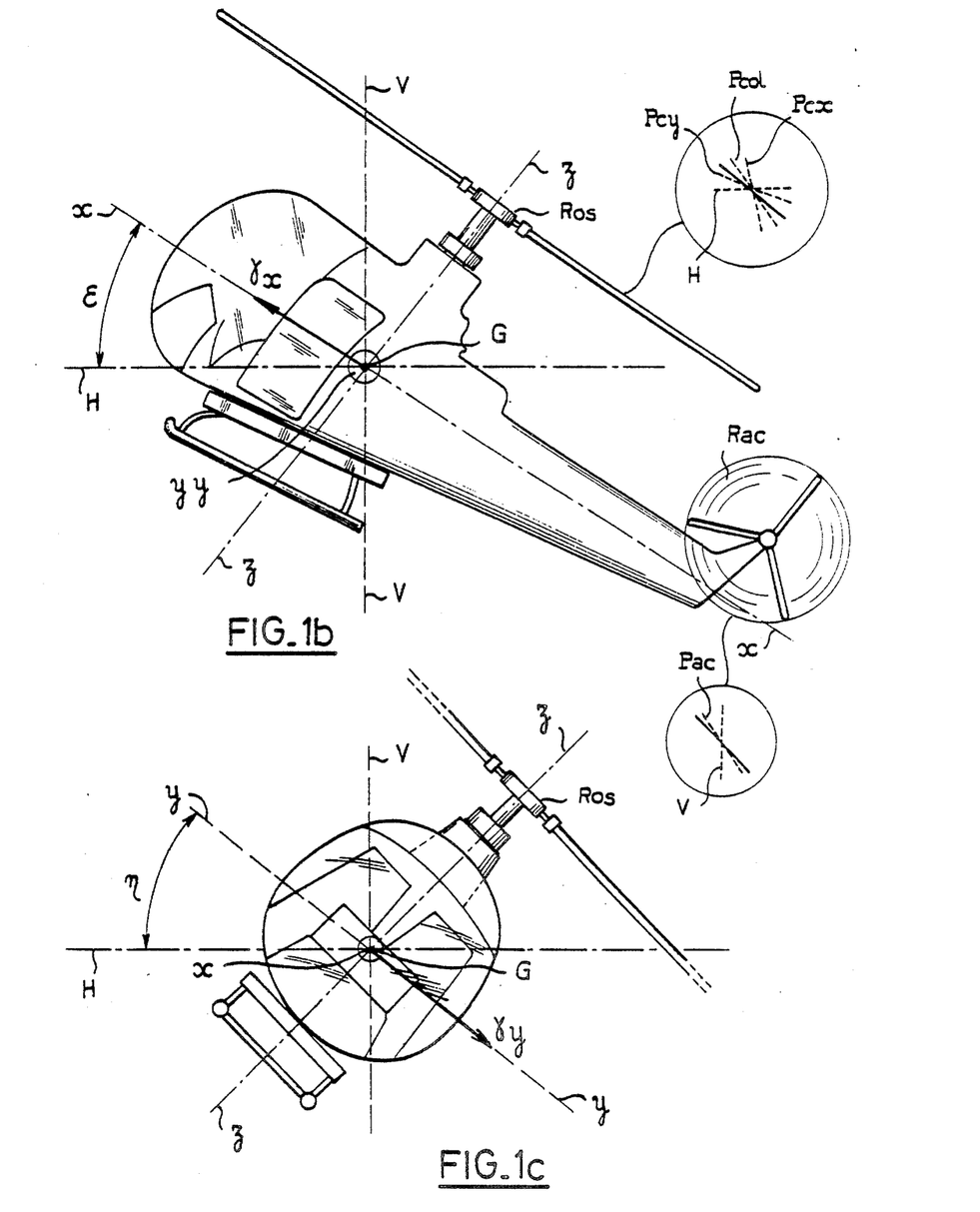
FIG. 1b represents a side view of a helicopter in flight.
FIG. 1c represents a front view of a helicopter in flight, FIGS. 1a, 1b and 1c being used to define and illustrate the various mechanical and dynamic parameters of the helicopter in flight.

The autonomous kinematic measurement system for helicopters, according to the invention, shall be described firstly with reference to the FIGS. 1a, 1b, 1c, which represent a helicopter in flight and make it possible to define the various mechanical and/or dynamic parameters that play a role in the kinematic measurement system according to the invention.

FIG. 1a shows a top view of the helicopter in flight, a reference of axes, a longitudinal axis xx and a lateral or transversal axis yy of the helicopter being related to it at its center of gravity G, the said helicopter following a path that forms a direction angle $\theta$ with the geographical north direction represented by the arrow N. The direction angle is defined as the angle formed by the longitudinal direction xx of the helicopter with the geographical north.

In FIG. 1b, which represents a side view of the helicopter in flight, the helicopter is taken to comprise a lifting rotor, marked Ros, and an anti-torque rotor, marked Rac. Conventionally, the helicopter also comprises first means to control the cyclic pitch, marked Pc, and collective pitch, marked Pcol, of the lifting rotor Ros. It is recalled, as a reminder, that the blades of the lifting rotor Ros have, with respect to a reference direction H in FIGS. 1a and 1b, a mean tilt called the collective pitch tilt which can, of course, be controlled by the pilot with the above-mentioned first control means.

On the collective pitch tilt of the blades of the lifting rotor Ros is superimposed an tilt called the cyclic pitch tilt, marked Pc. FIGS. 1b and FIGS. 1c further show the reference axis system comprising the longitudinal axis, marked xx, and the transversal lateral axis, marked yy, the said axes defining, when the helicopter is on the ground, a plane parallel to the said helicopter. The longitudinal direction x and the transversal direction y of the helicopter in flight are defined by its axes xx and yy. The axis zz is orthogonal to the plane formed by the above-mentioned axes xx and yy at the helicopter's center of gravity G. Of course, any other axis system, defined by translation of a determined vector, may be used non-restrictively and without leaving the framework of the object of the invention.

On the basis of the above-defined axes, the cyclic pitch, Pc, of the blades of the lifting rotor Ros can be divided into a longitudinal cyclic pitch Pcx of the lifting rotor Ros blades and a lateral cyclic pitch marked Pcy. The longitudinal cyclic pitch Pcx and the lateral cyclic pitch Pcy therefore appear as the tilt pitch of the blades, applied respectively to the said blades, when, in the course of rotation, a particular blade considered is aligned with the direction xx, yy respectively. The cyclic pitch tilt is thus applied so as to be superimposed on the collective pitch tilt of the lifting rotor blades, as is well-known in the working principle of helicopters.

When operating in flight conditions, the pilot is thus led to modify, firstly, the collective pitch tilt with a view to lifting the helicopter to a determined altitude and, secondly, the cyclic pitch tilt, especially the longitudinal and transversal cyclic pitch tilt, so as to ensure the corresponding translational movement of the helicopter, either in front-to-rear and rear-to-front motion, or in sideways motion. The collective pitch and the longitudinal and transversal cyclic pitch are modified by means of the above-mentioned first control means. These first control means shall be described in greater detail further below in the description.

FIG. 1 shows, in relation to the blades of the lifting rotor Ros, with respect to a reference direction such as the horizontal direction marked H, the collective pitch tilt, marked Pcol, and the cyclic pitch tilts, respectively the longitudinal cyclic pitch tilt Pcx and the lateral cyclic pitch tilt Pcy. These different tilts are shown in dots and dashes. The corresponding blade of the lifting rotor Ros is shown in a solid line and has an intermediate tilt with respect to the above-mentioned cyclic pitch and the collective pitch tilts. Furthermore, the helicopter comprises second pitch control means, marked Pac, of the anti-torque rotor, namely the tilt of its blades. In the same way, FIG. 1b shows the tilt parameter of the anti-torque pitch Pac in dashes with respect to a reference direction, namely the vertical direction marked V. The second control means can also be used by the pilot to adjust the anti-torque pitch tilt of the anti-torque rotor.

FIGS. 1b and 1c also show the attitude parameters of the helicopter in flight with the angle, marked E, between the tilt of the helicopter, in the plane that contains the longitudinal axis xx of the said helicopter, and the horizontal direction H. The above-mentioned angle E corresponds to the angle formed by the longitudinal acceleration component Yy with the horizontal direction, in the absence of the helicopter's own acceleration.

FIG. 1c also shows the angle of tilt N of the helicopter in the plane containing the lateral axis yy. This angle, marked m, corresponds to the angle formed by the lateral acceleration component, marked Xy, of the helicopter with the horizontal direction H, in the absence of the helicopter's own acceleration.

The mechanical and dynamic operating parameters of the helicopter in flight having now been defined with reference to the FIGS. 1a, 1b, 1c, a more detailed description of the autonomous kinematic measurement system for helicopters, of the invention, will be given with reference to FIG. 2.

As can be seen in the above-mentioned figure, the system according to the invention comprises means to measure the ground speed of the helicopter. In FIG. 2, the above-mentioned measuring means are marked R, D and may advantageously consist of a Doppler radar taken on board the helicopter. These means are not described in detail for they constitute the usual equipment of a fighter helicopter.

During operation, the means for measuring the helicopter's ground speed gives a signal, marked Vs, indicating the helicopter's ground speed. The helicopter speed signal Vs may be advantageously split up into its components along the helicopter's longitudinal axis xx and lateral axis yy, the said components being then Vsx and Vsy.

Figure 2:
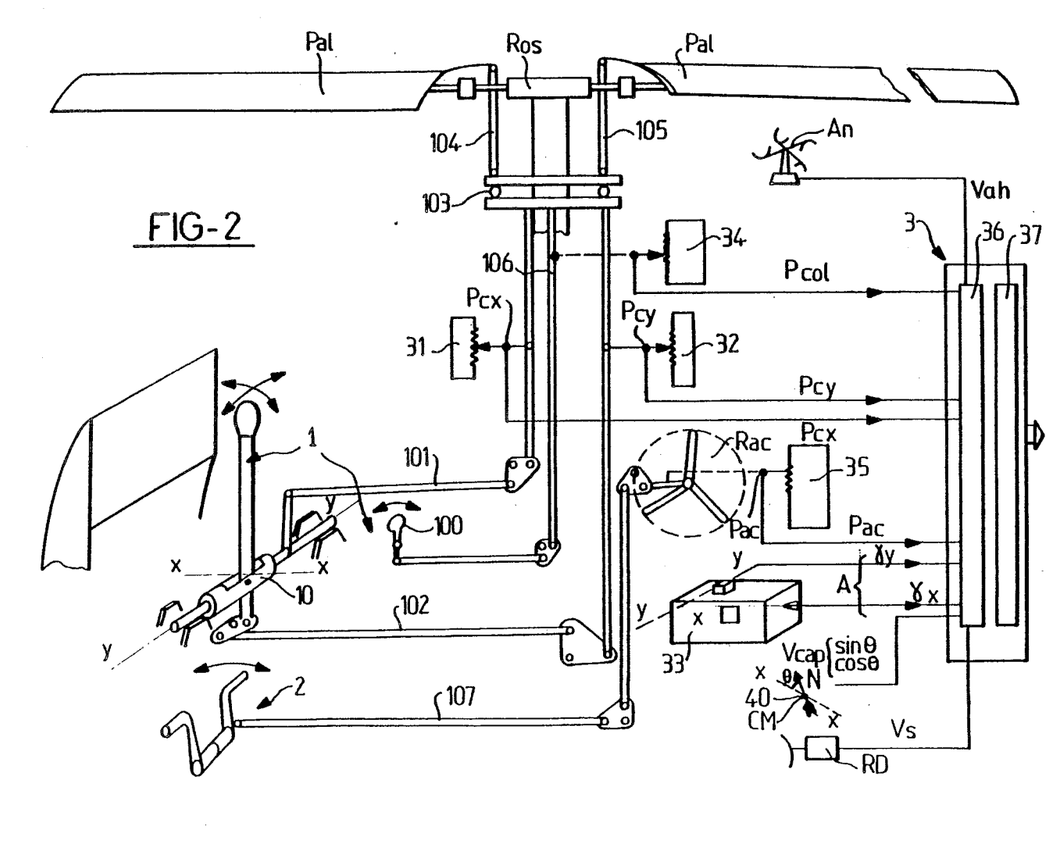
FIG. 2 represents a complete kinematic measurement system, according to the object of the invention.

Furthermore, as can be seen in FIG. 2, the autonomous navigation system according to the invention also comprises means to measure the direction angle of the helicopter -in flight. These means, marked CM in FIG. 2, are symbolically represented by an arrow N oriented with - respect to the direction xx. These means may advantageously comprise a magnetic compass for example. They shall not be described for this type of instrument is normally part of the on-board equipment of a helicopter.

FIG. 2 shows the essential elements of a helicopter comprising a lifting rotor, marked Ros, an anti-torque rotor, marked Rac, first means to control the cyclic pitch Pc and collective pitch Pcol of the blades of the lifting- rotor Ros. It will be noted that, conventionally, the first means, marked 1, for controlling the cyclic pitch Pc and the collective pitch Pcol of the lifting rotor Ros blades comprise a joystick type of handle that drives a dual rod assembly set, marked 101, 102, by means of by a mechanism 10 that gives the above-mentioned handle two degrees of freedom in the longitudinal direction xx and the transversal or lateral direction yy. The above-mentioned rod assembly set controls the longitudinal cyclic pitch Pcx and the transversal cyclic pitch Pcy respectively of the blades, marked Pal, of the lifting rotor through a clutch system 103 and intermediate rods 104, 105. The collective pitch Pcol is directly controlled, by the degree to which the clutch 103 is coupled, through a second lever marked 100 which can be used, through a rod assembly 106, to adjust the mean tilt of the lifting rotor blades and thus define the collective pitch Pcol. Of course, any control means other than those shown in FIG. 2 may be used. These mechanical elements shall not be described in greater detail for they come under the prior art as regards controlling the driving and orientation of a helicopter's blades.

Similarly the helicopter, as shown in FIG. 2 in its essential elements, has second means, marked 2, to control the pitch, marked Pac, of the anti-torque rotor Rac. The second control means, marked 2, can be used through a rod assembly 107 to adjust the tilt of the anti-torque rotor blades, Rac, in a way that is substantially similar to the adjusting of the collective pitch of the lifting rotor.

To provide for measurement of of the helicopter's airspeed in the low speed range, namely at helicopter airspeeds of less than 50 knots, i.e. about 25 m/s, without ancillary instruments for measuring the helicopter's airspeed in the low speed range, the autonomous kinematic measurement system of the invention, as shown in FIG. 2, very advantageously comprises means marked 3, 31, for measuring the longitudinal cyclic pitch, Pcx, of the lifting rotor blades Ros. These means give a longitudinal cyclic pitch, Pcx, measurement signal. Similarly, the autonomous kinematic measurement system for helicopters, according to the invention, comprises means; marked 3, 32, for measuring the lateral cyclic pitch, Pcy, of the lifting rotor blades Ros. These means give a lateral cyclic pitch, Pcy, measuring signal.

Similarly, there is provision for means 34 to measure the collective pitch, Pcol, applied to the blades of the lifting rotor Ros, the said means giving a collective pitch, Pcol, measuring signal. Similarly means 35 to measure the pitch Pac of the anti-torque rotor Rac give an anti-torque rotor Rac pitch Pac measuring signal.

As is further shown in FIG. 2, the autonomous kinematic measurement system for helicopters, according to the invention, also comprises accelerometer type means 33. The accelerometer type means may comprise, in principle, any means used to give a helicopter acceleration signal, marked A in FIG. 3. The acceleration signal A corresponds to a first signal Yx, representing the longitudinal acceleration, and a second signal Yy, representing the lateral acceleration of the helicopter with respect to the ground.

As a non-restrictive example, the accelerometer type means 33 may advantageously consist of a strap-down type
of inertial unit, marketed by the Applicant under the reference 28 SP by Societe De Fabrication D'Instruments De Mesure of Massy, France. This inertial unit is a high-performance unit that can meet the requirements of top-class helicopters used for complicated missions in the navy and for anti-tank warfare, intelligence and observation. For a !.comprehensive description of the performance of an inertial unit of this type, refer to the technical note No. 14485/01/83 published by the applicant.

Of course, the system further comprises an ancillary computer, reference 37 in FIG. 2. The ancillary computer may comprise a computer directly integrated into the above-mentioned initial unit or, on the contrary, it may non-restrictively comprise an independent computer.

Thus, as is shown in FIG. 2, the ancillary computing means 37 receive data Vs on the helicopter's ground speed, given .by the Doppler radar system or any equivalent system such as a satellite navigation system receiver of the NAVSTAR type. The ancillary computer, of course, also receives data on the longitudinal cyclic pitch Pcx, the lateral cydlic pitch Pcy and the collective pitch Pcol of the lifting rotor Ros as well as data on the pitch of the anti-torque rotor Pac and on the helicopter's longitudinal acceleration Yx and transveral or lateral acceleration Yv with respect to the ground. FIG. 2 shows the computing means 37 connected to various measuring means or sensors that give the above-mentioned data by means of a circuit 36 that acts as an interface between the computer itself 37 and the signals given by the above-mentioned sensing means.

According to the invention, the ancillary computing means or ancillary computers 37 give data on the helicopter's longitudinal airspeed .Vax and lateral airspeed Vay, the said longitudinal airspeed Vax and 20 lateral airspeed Vay being computed on the basis of a one-to-one function (i.e., a biunivocal function) of the values of measured mechanical and dynamic parameters, namely values of the longitudinal cyclic pitch Pcx, the lateral cyclic pitch Pcy, the collective pitch Pcol of the lifting rotor Ros, the pitch Pac of the anti-torque rotor Rac and the longitudinal accleration Vx and lateral acceleration Vy of the helicopter with respect to the ground.

Advantageously, the means 31, 32, for measuring the longitudinal cyclic pitch Pcx and the lateral cyclic pitch Pcy comprise position sensors to sense the position of the lifting rotor control means 101, 102. As is shown schematically in FIG. 2, these position sensors may advantageously consist of position-copying potentiometers, the moveable connection terminals of which are rigidly joined to the rods assemblies 101 and 102 respectively, that control the orientation of the lifting rotor blades.

In the same way, means 34, 35, to measure the collective pitch Pcol of the lifting rotor Ros and the pitch Pac of the anti-torque rotor Rac comprise position sensors to sense the position of-the means controlling the collective pitch of the lifting rotor blades and the anti-torque rotor. These position sensors also consist of position-copying potentiometers, the moveable terminals of which are connected-d to the control rod assemblies of the corresponding rotors, namely the rod assemblies 106 and 107 respectively.

According to a particularly advantageous aspect of the autonomous kinematic measurement system according to the invention, in the low airspeed range of the helicopter, the one-to-one function, used to establish the helicopter's longitudinal airspeed Vax and lateral airspeed Vay, is a linear combination of the above-mentioned measured data.

According to another advantageous characteristic of the kinematic measurement system of the invention, the linear combinations of measured data that establish the value of the helicopter's longitudinal airspeed Vax and lateral airspeed Vay respectively have the same form and respectively verify the relationships:

$$Vax = \alpha1\ Pcx + \alpha2\ Pcy + \alpha3Yx + \alpha4Yy + \alpha5\ Pcol + \alpha6\ Pac + \alpha7 \quad (1)$$

$$Vay = \beta1\ Pcx + \beta2\ Pcy + \beta3Yx + \beta4Yy + \beta5\ Pcol + \beta6\ Pac + \beta7 \quad (2)$$

In the above-mentioned relationships, the coefficients $\alpha1, \alpha2, \alpha3, \alpha4, \alpha5, \alpha6, \alpha7$ and $\beta1, \beta2, \beta3, \beta4, \beta5, \beta6, \beta7$ are coefficients belonging to the set of real numbers.

As is shown schematically, in FIG. 2, the measuring and computing means 3 comprise means 36 for sampling and digitizing the measurement signals of the longitudinal, cyclic pitch Pcx, lateral cyclic pitch Pcy, collective pitch Pcol and anti-torque rotor pitch Pac. These sampling and digitizing means are normally provided on the above-mentioned interface circuit. Of course, the above-mentioned interface circuit and the sampling means also receive data on the helicopter's ground speed, the signal Vs, which can be split up into two signals relating to the longitudinal ground speed component Vsx of the helicopter and the corresponding lateral speed component Vxy. The interface circuit 36, comprising the above-mentioned sampling and digitizing means also receives the signal Vcap, measured by the above-mentioned magnetic compass, and delivered, for example, by the inertial unit as described above. The sampling and digitizing means may advantageously consist of a fast analog/digital conversion board that gives the value of the corresponding signals in digitized form.

Figure 3:
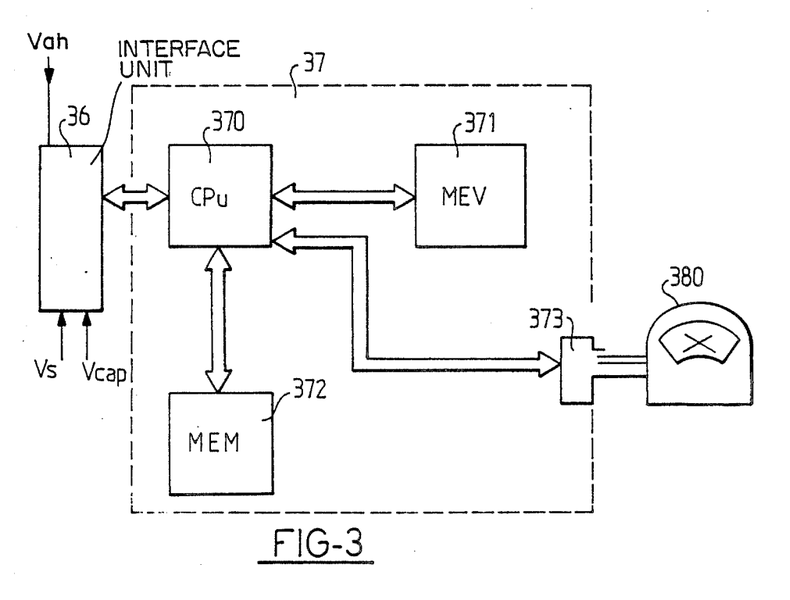
FIG. 3 represents a detail of an embodiment of an essential element of the kinematic measurement system according to the invention, consisting of the ancillary computer associated with the kinematic measurement system, FIG. 4a schematically represents a process for the calibration or education of, a kinematic measurement system according to the invention, by a series of elementary flying patterns, the said system being on board.

The computing means 37, as such, of the ancillary computing means of the autonomous kinematic measurement system shall now be described in greater detail with reference to FIG. 3.

According to the above-mentioned figure, the computing means 37 themselves may also comprise a central processing unit, CPU, reference 370, and memorizing means 372, the CPU being also coupled to an interface 373 which is then coupled to a display 380. The central processing unit, may, for example, consist of a microprocessor marketed under the reference 8080 by the firm INTEL. Furthermore, the computing means 37, themselves, comprise random-access memory type of memorizing means 371, designed to memorize the instantaneous value of the digitized measurements. The random-access memory 371, marked MEV in FIG. 3 preferably has a storage capacity of 0.5 K bytes. Furthermore, read-only memory type of memorizing means 372 are provided, the random-access memory 371 and the read-only memory 372 being connected to the central processing unit by a usual type of bus link. The read-only type of memorizing means 372 comprise, for a given type of helicopter and for a given helicopter of this type, a table of values having the coefficients, $\alpha1, \alpha2, \alpha3, \alpha4, \alpha5, \alpha6, \alpha7$ and $\beta1, \beta2, \beta3, \beta4, \beta5, \beta6, \beta7$, used to established the values of the longitudinal speed Vax and the lateral speed Vay, depending on the values measured during the operation of the helicopter.

Of course, the computing means 37 proper comprise a programme to compute the values of the linear combinations that express the longitudinal speed Vax and the transversal speed Vay. They may also, advantageously, comprise a programme to compute a change of axis by rotation substantially equal to 45°. For, during tests on navigation systems according to the invention, it was observed that the restitution of the helicopter's longitudinal airspeed value Vax and lateral airspeed value Vay, respectively, for a given type of helicopter was substantially improved when the longitudinal speed value Vax and lateral speed value Vay, respectively, were substantially made independent of the cross parameters of the cyclic pitch, Pcy and Pcx respectively, and of the corresponding accelerations Vy and Vx respectively. In this case, the coefficients $\alpha2, \alpha4$ and $\beta1, \beta3$ are minimum in the preceding relationships 1 and 2. For a given type of helicopter, their value is $\alpha2m$ and $\alpha4m$ and $\beta1m$ and $\beta3m$ respectively. In this case, the values of the helicopter's so-called longitudinal and so-called lateral airspeeds, Vax and Vay respectively, are expressed with reference to axes XY, oriented at substantially 45° with respect to the above-described axes xy. The effect of this axis rotation is to minimize the influence on the corresponding values of the speed of the orthogonal components of the lateral cyclic pitch Pcy and longitudinal cyclic pitch Pcx as well as the transversal acceleration Vy and longitudinal acceleration Vx.

Different tests for a given type of equipment, for example, a fighter helicopter marketed by the French firm Aerospatiale under the tradename PUMA, have shown that when the one-to-one functions were reduced to linear combinations, the best restitution of the longitudinal speed Vax and the lateral speed Vay was obtained for a number of coefficients of linear combinations equal to 7, namely with the coefficients $\alpha1$ to $\alpha7$ and $\beta1$ to $\beta7$ respectively. In this case, the residual speed deviation with respect to the longitudinal speed, value Vax, reached 1.3 knots, while the residual deviation with respect to the lateral speed Vay reached 1.69 knots, i.e., these deviations were both substantially smaller than 1 m/s. Hence, when using linear combinations, the number of coefficients $\alpha$, $\beta$ taken as being equal to 7 makes it possible to achieve an optimum restitution of longitudinal airspeed Vax and lateral airspeed Vay respectively.

Of course, before implanting the values of the coefficients $\alpha 1$, $\alpha 2$, $\alpha 3$, $\alpha 4$, $\alpha 5$, $\alpha 6$, $\alpha 7$ and $\beta 1$, $\beta 2$, $\beta 3$, $\beta 4$, $\beta 5$, $\beta 6$, $\beta 7$ in the read-only memory 372 of the computer itself, the above-mentioned coefficients being, of course, characteristic of a type of helicopter and of a particular helicopter, it is necessary to carry out a process for the calibration or education of the autonomous system of the invention in order to identify the above-mentioned coefficients. Prior to this identification, the kinematic measuring system of the invention is a non-dedicated system. By contrast, after the identification of the above-mentioned coefficients for a type of helicopter and for a helicopter of this particular type, this system becomes a dedicated and autonomous system.

In order to apply the process for calibrating or educating the non-dedicated kinematic measurement system as defined above, the computing means 37 proper, that receive the direction data (Vcap), also have a menu type of programme which can be used, by means of an interactive pilot/machine dialogue and through a system calibrating or educating operation for a type of helicopter and for a given helicopter, to identify the above-mentioned coefficients $\alpha$ and $\beta$, using a test flight of the helicopter having the kinematic measurement system on board.

Figure 4A:
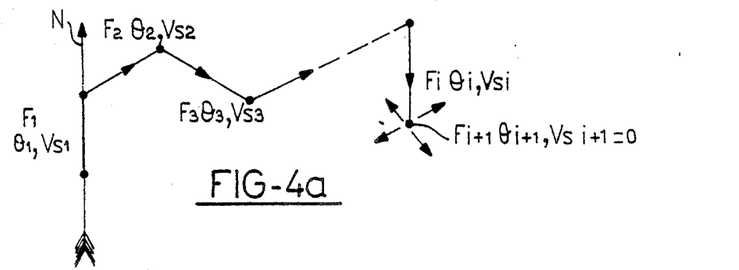

Thus, as shown schematically in FIG. 4a, the above-mentioned menu programme comprises a series of requests in which the pilot in the helicopter is asked, during the test flight, to perform several elementary flight patterns marked F1, F2, ... Fi. Each elementary flight pattern Fi is defined by a direction value Fi and a value of the helicopter's ground speed Vsi. Of course, the direction angle parameter $\theta i$ and the speed parameter Vsi are considered to be independent variables for the test flight and the elementary flight patterns Fi that constitute the said test flight.

Furthermore, as will be easily understood, for each elementary flight pattern Fi forming part of the test flight, the menu programme advantageously comprises a sub-programme for the acquisition of several calibration parameters. The calibration parameters consist of the value, measured during the order i elementary flight pattern, of the longitudinal cyclic pitch pcxi, lateral cyclic pitch pcyi, longitudinal acceleration Vxi, lateral acceleration Vyi, collective pitch pcoli, anti-torque rotor pitch paci and the cosine and sine of the direction angle $\theta i$ of the helicopter.

Figure 4B:
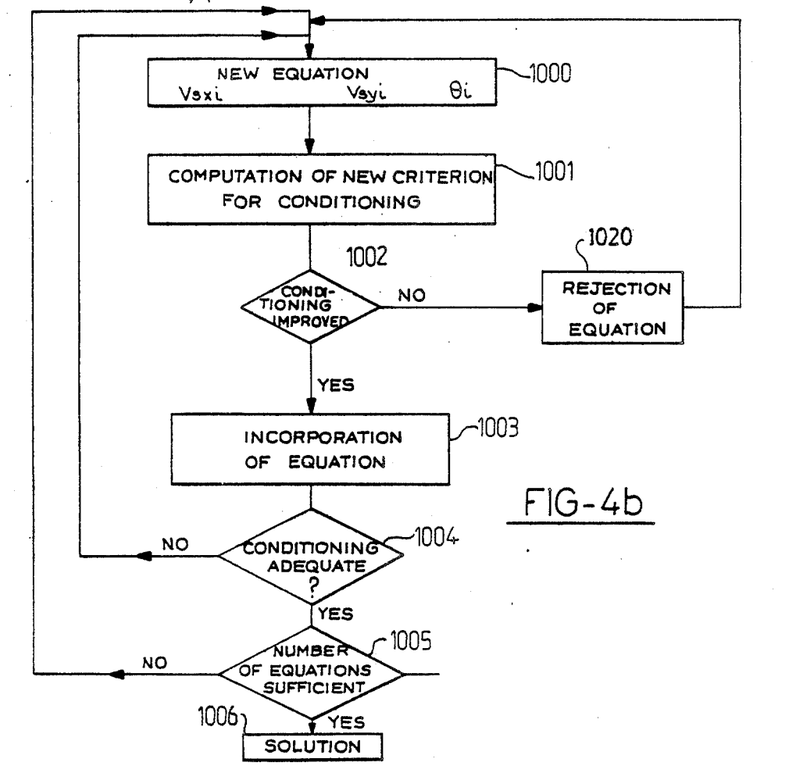
FIG. 4b is a flow chart of a menu type programme which can be used, through an interactive pilot/machine dialogue to conduct the above-mentioned calibration or education process.

As is shown schematically in FIG. 4b, for each elementary flight pattern Fi forming a part of the test flight, the menu type programme comprises a sub-programme to assess the calibration parameters for the test flight considered. FIG. 4b represents a flow chart of the above-mentioned sub-programme. The above-mentioned sub-programme consists in using the measured values of the helicopter's ground speed Vs, expressed in the form of its longitudinal speed component Vsx and lateral speed component Vsy, to establish the following linear forms at the stage marked 1000, for the longitudinal and transversal directions of the helicopter:

$$Vsxi = \alpha 1 \times pcx_i + \alpha 2 \times pcy_i + \alpha 3 \times Yx_x + \alpha 4 \times Yyi + \alpha 5 \times pcol_i + \alpha 6 \times pac_i + \alpha 7 + \alpha 8 \times \cos\theta_i + \alpha 9 \times \sin\theta_i \quad (3)$$

$$Vsyi = \beta 1 \times pcxi + \beta 2 \times pcy_i + \beta 3 \times Yx_i + \beta 4 \times Yyi + \beta 5 \times pcol_i + \beta 6 \times pac_i + \beta 7 + \beta 8 \times \cos\theta_i + \beta 9 \times \sin\theta_i \quad (4)$$

In the above-mentioned relationships, it will be noted that the coefficients $\alpha 1$, $\alpha 2$, $\alpha 3$, $\alpha 4$, $\alpha 5$, $\alpha 6$, $\alpha 7$, and $\beta 1$, $\beta 2$, $\beta 3$, $\beta 4$, $\beta 5$, $\beta 6$, $\beta 7$ are none other than the coefficients of the linear combinations described earlier in the invention. Similarly, the coefficients $\alpha 8$, $\alpha 9$ and $\beta 8$, $\beta 9$, correspond to the estimated north and east components of the wind speed during elementary flight patterns Fi considered or during the test flight. For this calibration stage, the wind should have a low speed, but, above all, it should have a substantially constant value during each test flight considered, i.e. the wind should have practically no. gusts. Thus the computing algorithm, as shown in FIG. 4a, determines not only the above-mentioned calibration parameters, but also the two wind components, north and east, which are then assumed to be constant during the test.

The linear forms corresponding to the above relationships 3 and 4 are then subjected, at the step 1001, 1002, of FIG. 4b, to a validation test for the calibration parameters of the corresponding elementary flight pattern Fi. Upon a negative response as regards the improvement of the. conditioning of the navigation system, the linear form represented by the relationship 3 or the relationship 4, or equation, is rejected at 1020 and the menu type programme then returns to the initial position to lead the pilot to perform another elementary flight pattern, enabling him to make a fresh attempt.

Upon a positive response to the test on the improvement of the conditioning of the system at 1002, the linear form or equation given by the relationships 3 or 4 is then incorporated at 1003 so as to constitute a system of linear equations representing the state of the machine system, namely the kinematic measurement system of the invention, after the order i elementary flight pattern Fi is accepted. Preferably, the system of equations S(Vsxi), S(Vsyi) could comprise a redundant number of equations as shall be described further below in the description.

The system of linear equations thus formed, S(Vsxi), S(Vsyi), comprising i equations pertaining to the helicopter's ground speed, longitudinal speed Vsxi and lateral speed VSyi, is then subjected to a test of adequate conditioning. This test may consist of a comparison of the number of values of independent variables, the direction angle $\theta i$ and ground speed Vsxi, Vsyi, with respect to a reference value for example. A negative response to the above-mentioned test, at 1004, on adequate conditioning, has the effect of bringing the system to the initial position for the choice of a new elementary flight pattern, capable of providing for the establishment of a new linear form or new equation, using an additional elementary flight pattern.

On the contrary, if there is a positive response to the test formed at 1004, the system of equations S(Vsxi), S(Vsyi) is subjected, at 1005, to a test on the sufficiency of the number of equations that constitute it. The purpose of this test is to lead the pilot, upon a negative response, to perform another elementary flight pattern by returning to the initial situation and, upon a positive response to solve, at 1006, the system of equations in order to determine the values of the coefficients $\alpha 1$ to $\alpha 9$ and $\beta 1$ and $\beta 4$ constituting the linear combinations that will make it possible to express the helicopter's longitudinal airspeed Vax and lateral airspeed Vay.

According to an advantageous characteristic of the method for calibrating or educating the kinematic measurement system of the invention, the test 1001, 1002 for validation of the calibration parameters of the corresponding elementary flight pattern Fi is done upon a status criterion representing a uniform distribution of the direction angles $\theta i$ and the ground speed values Vsxi and Vsyi and in the range of speeds and direction angles used to define the elementary flight patterns Fi.

The requests or directives given to the pilot by the menu type programmes are advantageously given in the form of instructions on direction angles $\theta i$ and ground speed Vsi for the different successive elementary flight patterns Fi. The instructions on ground speed are given to the pilot in the form of longitudinal ground speed Vsxi component and lateral ground speed Vsyi component values. Advantageously but not exhaustively, the elementary flight patterns Fi may comprise hovering patterns for different directions, sideslip flight patterns for example.

The process for calibrating or educating the kinematic measurement system of the invention provides for an experimental determination of the various coefficients that play a part in the linear combinations to restitute the helicopter's airspeed in the longitudinal and lateral directions of the said helicopter. This identification of the coefficients is done during a special flight, lasting about 20 minutes and comprising the above-mentioned paths or elementary flight patterns Fi. In view of the ease with which the kinematic measurement system of the invention can be used, a calibration process may, of course, be conducted when the helicopter considered is put into operation for the first time: the said calibration process can be done using a non-dedicated system, when there are no linear combination coefficients implanted in the read-only memory 372, or using a pseudo-dedicated system in which the values of the coefficients of the above-mentioned linear combinations correspond to mean values for a type of machine considered. Furthermore, and in view of the ease with which the kinematic measurement system of the invention can be used, a new calibration or education process may be advantageously performed each dismantling of the helicopter rotor or of a pitch-measuring means or any mechanical part essential for the flight of the helicopter. Thus, the kinematic measurement system of the invention adapts itself to variations in its construction or mechanical maintenance. The calibration or education process is entirely automatic, as described earlier, and can be triggered by control words, for example-. The menu type programme and the sub-programmes for acquisition and for testing conditioning adequacy at 1004 and the sufficiency of the number of equations at 1005 can be used for the automatic selection of the most efficient measurements. The calibration parameters or coefficients of the linear combinations for the restitution of airspeed may then be computed when a sufficient number of measurements has been selected.

The system of equations can then be solved, it being possible to perform a recursive type or Kalmann type of filtering in order to improve computing precision. f course, the above-mentioned filtering is envisaged essentially in the case where the number of equations comprising the system is far greater than the number of coefficients to be computed and, therefore, shows a certain degree of redundancy.

The computations of the wind speed components in the north and east directions are usually independent. However, the algorithm provides for the possibility of using, on the longitudinal axis, the wind components computed on the transversal axis, and vice-versa. The calibration algorithm is automatic. It selects the best measurements according to a criterion of acceptance, described earlier, that makes it possible to improve the estimates of the coefficients $\alpha$ and $\beta$ by the least error squares method at each acquisition of order i calibration measurement values corresponding to an accepted flight pattern Fi.

Furthermore, the algorithm also provides for the routine rejection of measurements coming from a transitory flight stage in which there is an excessive acceleration or an excessive angular velocity.

Following the test flight, the values of the coefficients $\alpha$ and $\beta$ of the helicopter's airspeed restituting linear combinations are implanted in the read-only memory 372. The kinematic measurement system of the invention is then autonomous and constitutes a dedicated kinematic measurement system. It can then be used to give, from the values of the helicopter's measured mechanical and dynamic operating parameters and from the conditioned linear combinations, namely those linear combinations in which the coefficients have been determined not only for the corresponding type of machine but also for the machine itself, the helicopter's longitudinal airspeed values Vax and Vay, especially in the low-speed range of the said helicopter.

In order to provide for a measurement of the helicopter's airspeed throughout its speed range, the kinematic measurement system of the invention, as shown in FIG. 2, further comprises high airspeed measuring means, marked An, which can be used to establish the value of the helicopter's longitudinal airspeed Vah at high speed. Of course, these airspeed measuring means An are conventional type means and shall not be described in detail. They are represented symbolically in FIG. 2 by a schematic drawing of an airspeed indicator.

Figure 4C:
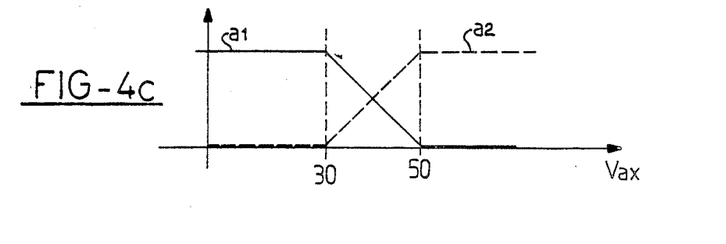
FIG. 4c is a diagram of the weighting coefficient values used to make a transition of the computed value of the helicopter's speed Vax throughout the said helicopter's range of speeds, both high and low.

According to another advantageous feature of the kinematic measurement system of the invention as whose by FIG. 4c, in order to provide for a transition of the value of the helicopter's longitudinal speed Vax throughout the said helicopter's speed range, the computing means proper 37 also comprise a programme for weighting the above-mentioned speeds, in which the helicopter's resultant longitudinal airspeed Vrx is computed as the weighted sum of the longitudinal components, Vax1 and Vax2, respectively given by the computing means, using the above-described conditioned linear combinations, and by the high airspeed measuring means respectively. The helicopter's resultant longitudinal airspeed, after weighting, verifies the following relationship.

$$Vr\,x = a1\,Va\,x1 + a2\,Va\,x2 \qquad 5$$

In the above-mentioned relationship 5, the weighting coefficients verify the relationship $a1 + a2 = 1$. FIG. 4c shows the corresponding variation relationship of the weighting coefficients, a1 and a2, according to the value of the helicopter's airspeed for the total speed range considered. The above-mentioned weighting computations may advantageously be done through a sub-programme which can be used, for the estimated value of the helicopter's airspeed, to determine the corresponding value of the weighting coefficients a1 and a2.

We have thus described an autonomous kinematic measurement system for helicopters and the use of the said system. The autonomous kinematic measurement system for helicopters, according to the invention, is particularly advantageous because of its flexibility in use depending on the helicopter's variable aerodynamic and/or mechanical parameters during its lifetime. The high adaptability of the kinematic measurement system of the invention, not only to the considered type of machine, but to the particular machine of this type considered, enables the use of helicopters fitted with the autonomous kinematic measurement system of the invention in total safety and in optimum piloting conditions regardless of the mission entrusted to the said helicopter. The kinematic measurement system of the invention can be used for flight simulation.

What is claimed is:

1. An autonomous kinematic measurement system for a helicopter, said helicopter comprising a lifting rotor (Ros), an antitorque rotor (Rac), first means to control the cyclic pitch (Pc) and the collective pitch (Pcol) of the lifting rotor (Ros) and second means to control the anti-torque rotor pitch (Pac) wherein, longitudinal x and transversal y directions being defined through reference axes x, y, bound to the helicopter's center of gravity and defining, with the helicopter on the ground, a plane parallel to the ground, said system comprises means to measure the helicopter's ground speed, said means generating, during operation, a signal (Vs) of the helicopter's ground speed, means to measure the longitudinal cyclic pitch (Pcx) of the lifting rotor (Ros) blades, said means giving a longitudinal cyclic pitch measurement signal (Pcx), means to measure the lateral cyclic pitch (Pcy) of the lifting rotor (Ros) blades, said means giving a lateral cyclic pitch measurement signal (Pcy), means to measure the collective pitch applied to the lifting rotor (Ros) blades, said means delivering a collective pitch measurement signal, means to measure the pitch (Pac) of the anti-torque rotor (Rac), said means delivering a measurement signal of the pitch (Pac) of the anti-torque rotor (Rac), accelerometer means for measuring the acceleration of the helicopter, generating a helicopter acceleration signal and delivering said helicopter acceleration signal corresponding to a first signal (Vx) that represents the helicopter's longitudinal acceleration and a second signal (Vy) that represents the helicopter's lateral acceleration relative to the ground, means to measure the helicopter's direction angle ($\theta$), delivering a signal (Vac) representing the direction angle of the helicopter's reference axis x with respect to geographic north, ancillary computing means for receiving said data (Vs) representing the helicopter's ground speed, data (Pcx) (Pcy) and (Pcol) on the longitudinal, lateral and collective cyclic pitch of the lifting rotor (Ros), data (Pac) on the antitorque rotor pitch, data (Vx) and (Vy) on the helicopter's longitudinal and transversal acceleration with respect to the ground, and computing a set of values of a set of linear combinations expressing the helicopter's longitudinal (Vax) and lateral (Vay) airspeeds, the longitudinal (Vax) and lateral (Vay) airspeeds being computed from a one-to-one function of the values of the measured mechanical and dynamic parameters of the lifting rotor's longitudinal cyclic pitch (Pcx), lateral cyclic pitch (Pcy) and collective pitch (Pcol), the pitch (Pac) of anti-torque rotor (Rac), and the helicopter's longitudinal (Vx) and lateral (Vy) acceleration with respect to the ground.

2. A system according to claim 1 wherein, the helicopter has at least a first and a second airspeed range, said first range being lower than said second range and in the helicopter's first airspeed range, the one-to-one function from which the helicopter's longitudinal airspeed speed (Vax) and lateral airspeed (Vay) are computed, is a linear combination of the measured data.

3. A system according to claim 2 wherein the linear combinations of the measured data establishing the value of the helicopter's longitudinal airspeed (Vax) and lateral airspeed (Vay) respectively have the same form and respectively verify the following relationship:

$$\text{Vax} = \alpha 1\, \text{Pcx} + \alpha 2\, \text{Pcy} + \alpha 3 \text{Vx} + \alpha 4 \text{Vy} + \alpha 5\, \text{Pcol} + \alpha 6\, \text{Pac} + \alpha 7 \quad (1)$$

$$\text{Vay} = \beta 1\, \text{Pcx} + \beta 2\, \text{Pcy} + \beta 3 \text{Vx} + \beta 4 \text{Vy} + \beta 5 \text{Pcol} + \beta 6\, \text{Pac} + \beta 7 \quad (2)$$

relationships in which $\alpha 1 \ldots \alpha 7$ and $\beta 1 \ldots \beta 7$ are coefficients belonging to the set of real numbers.

4. A system according to claim 1 wherein said computing means comprise:

a central processing unit;

means for sampling and digitizing the measurement signals of the longitudinal cyclical pitch (Pcx), the lateral cyclical pitch (Pcy), the collective pitch (Pcol) and the pitch (Pac) of the anti-torque rotor, said sampling means being connected to said central processing unit;

memory means of the random-access memory type, designed to store the instantaneous value of the digitized measurement values, said memory means is connected to said central processing unit;

memory means of the read-only memory type comprising, for a given type of helicopter, a table of values of the constant coefficients $\alpha 1 \ldots \alpha 7$ and $\beta 1 \ldots \beta 7$ used to establish the longitudinal speed (Vax) and lateral speed (Vay) values according to the values measured during operation, said memory means of the read-only memory type being connected to said central processing unit.

5. A system according to claim 1 wherein said computing means comprise:

first means for computing the values of the linear combinations expressing the longitudinal speed (Vax) and transversal speed (Vay), second means for computing change of XY axes rotation substantially equal to 45°.

6. A system according to claim 1 wherein said computing means, further receiving direction angle data (Vcap), also comprises program means which can be used, by means of an interactive pilot/machine dialogue, to perform, through an operation to calibrate or educate the system for a type of helicopter and for a given helicopter, an identification of the coefficients $\alpha 1 \ldots \alpha 7$ and $\beta 1 \ldots \beta 7$ constituting the set of linear combinations used to express the helicopter's longitudinal airspeed (Vax) and lateral airspeed (Vay) from a test flight of the helicopter having said system on board.

7. A system according to claim 6 wherein said program means causes a series of requests to be supplied to the pilot in the helicopter, asking him to perform several elementary flight patterns (Fi) during the test flight, each elementary flight pattern (Fi) being defined by a direction value ($\theta i$) and a value of the helicopter's ground speed (Vsi), the direction angle ($\theta i$) and speed (Vsi) parameters being considered as being independent variables for the test flight considered.

8. A system according to claim 7 wherein, during each elementary test pattern (Fi) forming part of the test flight, the program means includes a sub-program means for the acquisition of several calibration parameters, the calibration parameters consisting of the measured value, during the order i elementary test pattern, of the longitudinal cyclical pitch ($Pcx_i$), the lateral cyclical pitch ($pcy_i$), the longitudinal acceleration ($Vx_i$), the lateral acceleration ($Vy_i$), the collective pitch ($pcol_i$), the anti-torque rotor pitch ($pac_i$), the cosine and sine of the direction angle $\theta i$ of the helicopter.

9. A system according to claim 7 wherein, during the said elementary flight patterns (Fi) constituting the test flight said program means comprises a sub-program means for the evaluation of the calibration parameters for the order i elementary flight pattern considered, said sub-program means being adapted to use the measured values of the helicopter's ground speed, namely longitudinal speed (vsxi) and lateral speed (Vsyi) to:

establish for the longitudinal and transversal directions of the helicopter, the linear forms $Vsxi = \alpha1 \times pcx_i + \alpha2 \times pcy_i + \alpha3 \times Vx_i + \alpha4 \times Vy_i + \alpha5 \times pcol_i \times \alpha6 \times pac_i + \alpha7 + \alpha8 \times \cos \theta_i + \alpha9 \times \sin \theta_i$ $Vsyi = \beta1 \times pcx_i + \beta2 \times pcy_i + \beta3 \times Vx_i + \beta4 \times Vy_i + \beta5 \times pcol_i \times \beta6 \times pac_i + \beta7 + \beta8 \times \cos \theta_i + \beta9 \times \sin \theta_i$ subject the linear forms to a test for the validation of the calibration parameters of the corresponding elementary flight pattern (Fi),
incorporate the linear forms in a system of linear equations representing the state of the machine system after the order i elementary flight pattern (Fi) is accepted,
subject the system of equations (S(Vsxi)); (S(Vsyi)) comprising a redundant number of equations pertaining to the helicopter's ground speed constituting longitudinal speed (Vsxi) and lateral speed (Vsyi), to a test on conditioning adequacy consisting in a comparison of the number of independent variable values for direction angle ($\theta i$) and ground speeds (Vsxi, Vsyi),
subject the system of equations (S(Vsxi)); (S(Vsyi)) to a test on the sufficiency of the number of equations constituting it so as to request the pilot, upon a negative response to perform another elementary flight pattern, and, upon a positive response, to solve
the system of equations to determine the value of the coefficients $\alpha1 ... \alpha7$ and $\beta1 ... \beta7$ constituting the linear combinations used to express the helicopter's longitudinal airspeed (vax) and lateral airspeed (Vay), the coefficients $\alpha8, \alpha9$, and $\beta8, \beta9$, corresponding to the north and east components of the wind speed estimated during elementary flight patterns (Fi) or during test flights while the wind is at a low speed.

10. A system according to claim 9 wherein the test for validating the calibration parameters of the corresponding elementary flight pattern (Fi) is done by a status criterion representing the uniform distribution of direction angles ($\theta i$) and ground speed values (Vsxi), (Vsy) in the range of speeds and the direction angles used to define the elementary flight patterns (Fi).

11. A system according to claim 9 wherein, following the test flight, the values of the coefficients $\alpha1 ... \alpha7$ and $\beta1 ... \beta7$ of the linear combinations are implanted in a read only memory, said system being then autonomous and constituting, a dedicated system giving, from the measured values of the helicopter's mechanical and dynamic operation parameters and the conditioned linear combinations, the values of the helicopter's longitudinal airspeed (Vax) and lateral airspeed (Vay).

12. A system according to claim 7 wherein the directives, given to the pilot by said program means are given in the form of direction angle ($\theta i$) and ground speed (Vsi) instructions for the various successive elementary flight patterns (Fi).

13. A system according to claim 12 wherein the ground speed instructions given to the pilot by said program means are in the form of values of longitudinal ground speed (Vsxi) and lateral ground speed (Vsyi) components, the elementary flight patterns comprising several sideslipping flights.

14. A system according to claim 1 further comprising high airspeed measuring means (An) which can be used to establish the value of the helicopter's longitudinal airspeed (Vahx) at high speed.

15. A system according to claim 1 wherein, in order to provide for a transition of the longitudinal airspeed (Vax) value throughout the speed range of the helicopter, the said computing means comprise a programme for weighting the said speeds, in which the resultant longitudinal speed (Vrx) is computed as the weighted sum of the longitudinal components, (Vax 1) and (Vax 2), respectively given by the computing means from the conditioned linear combinations and the high-speed airspeed measuring means respectively $$Vrx = a1\ Vax1 + a2\ Vax2 \text{ with } a1 + a2 = 1 \quad (5)$$

16. A system according to claim 1 wherein the direction angle $\theta$ of the helicopter is measured by means of a magnetic compass.

17. A method for educating an on-dedicated kinematic measurement system for helicopters, said helicopters comprising a lifting rotor (Ros), an anti-torque rotor (Rac), first means to control the cyclic pitch (pc) and the collective pitch (Pcol) of the lifting rotor (Ros) and second means to control the anti-torque rotor pitch (Pac), whose longitudinal axis (x) and transversal y directions being defined by reference axes (x, y) bound to the helicopter's center of gravity and defining, with the helicopter on the ground, a plane parallel to said ground, said system comprising means to measure the helicopter's ground speed, said means generating, during operation, a signal (Vs) of the helicopter's ground speed, means to measure the longitudinal cyclic pitch (Pcx) of the lifting rotor (Ros) blades, said means giving a longitudinal cyclic pitch (Pcy) measurement signal, means to measure the lateral cyclic pitch (Pcy) of the lifting rotor (Ros) blades, said means generating a lateral cyclic pitch measurement signal (Pcy), means to measure the collective pitch applied to the lifting rotor (Ros) blades, said means delivering a collective pitch measurement signal, means to measure the pitch (Pac) of the anti-torque rotor (Rac), said means delivering a measurement signal of the pitch (Pac) of the anti-torque rotor (Rac), accelerator means for measuring the acceleration of the helicopter, generating and delivering a helicopter acceleration signal, said acceleration signal corresponding to a first signal (vx) that represents the helicopter's longitudinal acceleration and a second signal (vy) that represents the helicopter's lateral acceleration relative to the ground, means to measure the helicopter's direction angle ($\theta$) delivering a signal (Vac) representing the direction angle of the helicopter's axis (x) with respect to geographic north and ancillary computing means receiving data (Vs) on the helicopter's ground speed, data (Pcx) (Pcy) and (Pcol) on the longitudinal, lateral and collective cyclic pitch of the lifting rotor (Ros), data (Pac) on the anti-torque rotor pitch, data (vx) and (vy) on the helicopter's longitudinal and transversal acceleration with respect to the ground, and delivering data on the helicopter's longitudinal (Vax) and lateral (Vay) airspeeds, the longitudinal (Vax) and lateral (Vay) airspeeds being computed from a linear combination of the measured mechanical and dynamic parameters of the lifting rotor's longitudinal cyclic pitch (Pcx), lateral cyclic pitch (Pcy) and collective pitch (Pcol), the pitch (Pac) of anti-torque rotor (Rac), and the helicopter's longitudinal (Vx) and lateral (Vy) acceleration with respect to the ground, wherein said method comprises the steps of:

submitting said helicopters and measurement system to at least two flight patterns (Fi), each defined by the helicopter's direction signal ($\theta$i) and ground speed (Vsi) in a test flight, determining a set of coefficients ($\alpha\beta$) constituting the linear combinations used to express the helicopter's longitudinal airspeed (Vax), and lateral airspeed (Vay), memorizing said determined coefficients to constitute a kinematic measurement system.

* * * * *

UNITED STATES PATENT AND TRADEMARK OFFICE
CERTIFICATE OF CORRECTION

PATENT NO. : 4,970,651
DATED : November 13, 1990       PAGE 1 OF 4
INVENTOR(S) : Favre et al.

It is certified that error appears in the above-identified patent and that said Letters Patent is hereby corrected as shown below:

In column 1 at line 27, please start a new paragraph beginning with the word " Airspeed ".

In column 4 at line 57, please delete " Yy " and insert -- $\gamma_x$ --.

In column 4 at line 59, please delete " N " and insert -- $\eta$ --.

In column 4 at line 62, please delete " Xy " and insert -- $\gamma_y$ --.

In column 5 at lines 21, 23, and 32, please delete " - ".

In column 6 at line 12, please start a new paragraph beginning with the word " Similarly ".

In column 6 at line 21, please delete " Yx " and insert -- $\gamma_x$ --.

In column 6 at line 22, please delete " Yy " and insert -- $\gamma_y$ --.

In column 6 at line 27 - 28, please merge lines to read " type of ".

In column 6 at line 29, please delete " SP " and insert -- SH --.

In column 6 at line 34, please delete " !. ".

In column 6 at line 46, please delete " . ".

In column 6 at line 53, please delete " Yx " and insert -- $\gamma_x$ --.

UNITED STATES PATENT AND TRADEMARK OFFICE
CERTIFICATE OF CORRECTION

PATENT NO. : 4,970,651
DATED : November 13, 1990    PAGE 2 OF 4
INVENTOR(S) : Favre et al.

It is certified that error appears in the above-identified patent and that said Letters Patent is hereby corrected as shown below:

In column 6 at line 54, please delete " Yv " and insert -- $\gamma_y$ --.

In column 6 at line 62, please delete " . ".

In column 6 at line 63, please delete " 20 ".

In column 7 at line 38, equation 1, please delete " Yx " and insert -- $\gamma_x$ --.

In column 7 at line 38, equation 1, please delete " Yy " and insert -- $\gamma_y$ --.

In column 7 at line 58, please delete " Vxy " and insert -- Vsy --.

In column 9 at line 36, please delete " Fi " second and insert -- i --.

In column 9 at line 67, please delete " Yx$_x$ " and insert -- $\gamma_{xi}$ --.

In column 9 at line 68, please delete " Yy$_i$ " and insert -- $\gamma_{yi}$ --.

In column 10 at line 2, please delete " Yx$_i$ " and insert -- $\gamma_{xi}$ --.

In column 10 at line 2, please delete " Yy$_i$ " and insert -- $\gamma_y i$ --.

In column 10 at line 27, please delete " . ".

In column 10 at line 68, please delete " $\beta 4$ " and insert -- $\beta 9$ --.

In column 11 at lines 50-51, please merge lines to read " to variations ".

UNITED STATES PATENT AND TRADEMARK OFFICE
CERTIFICATE OF CORRECTION

PATENT NO. : 4,970,651
DATED : November 13, 1990    PAGE 3 OF 4
INVENTOR(S) : Favre et al.

It is certified that error appears in the above-identified patent and that said Letters Patent is hereby corrected as shown below:

In column 11 at line 65, please delete " f " and insert --of--.

In column 13, claim 1 at lines 23 and 64, please delete ' antitorque" and insert -- anti-torque --.

In column 14, claim 3 at line 22, please delete " relationship " and insert -- relationships --.

In column 14, claim 3 at line 24, equation 1, please delete " Vax " and insert -- Vax = --.

In column 14, claim3 at line 24, equation 1, please delete " Pcx " and insert -- Pcx + --.

In column 14, claim 3 at line 24, equation 1, please delete " Pcy " and insert -- Pcy + --.

In column 16, claim 10 at line 7, please delete " Vsy " and insert -- Vsyi --.

UNITED STATES PATENT AND TRADEMARK OFFICE
CERTIFICATE OF CORRECTION

PATENT NO. : 4,970,651

DATED : November 13, 1990      PAGE 4 OF 4

INVENTOR(S) : Favre et al.

It is certified that error appears in the above-identified patent and that said Letters Patent is hereby corrected as shown below:

In column 16, claim 17 at line 51, please delete " on " and insert -- non --.

In column 16, claim 17 at line 54, please delete " pc " and insert -- Pc --.

Signed and Sealed this

Twenty-eighth Day of October, 1997

*Attest:*

BRUCE LEHMAN

*Attesting Officer*      *Commissioner of Patents and Trademarks*